Jan. 16, 1945.  C. W. REDLUND  2,367,430
AMUSEMENT ATTACHMENT FOR BICYCLES
Filed Aug. 27, 1942
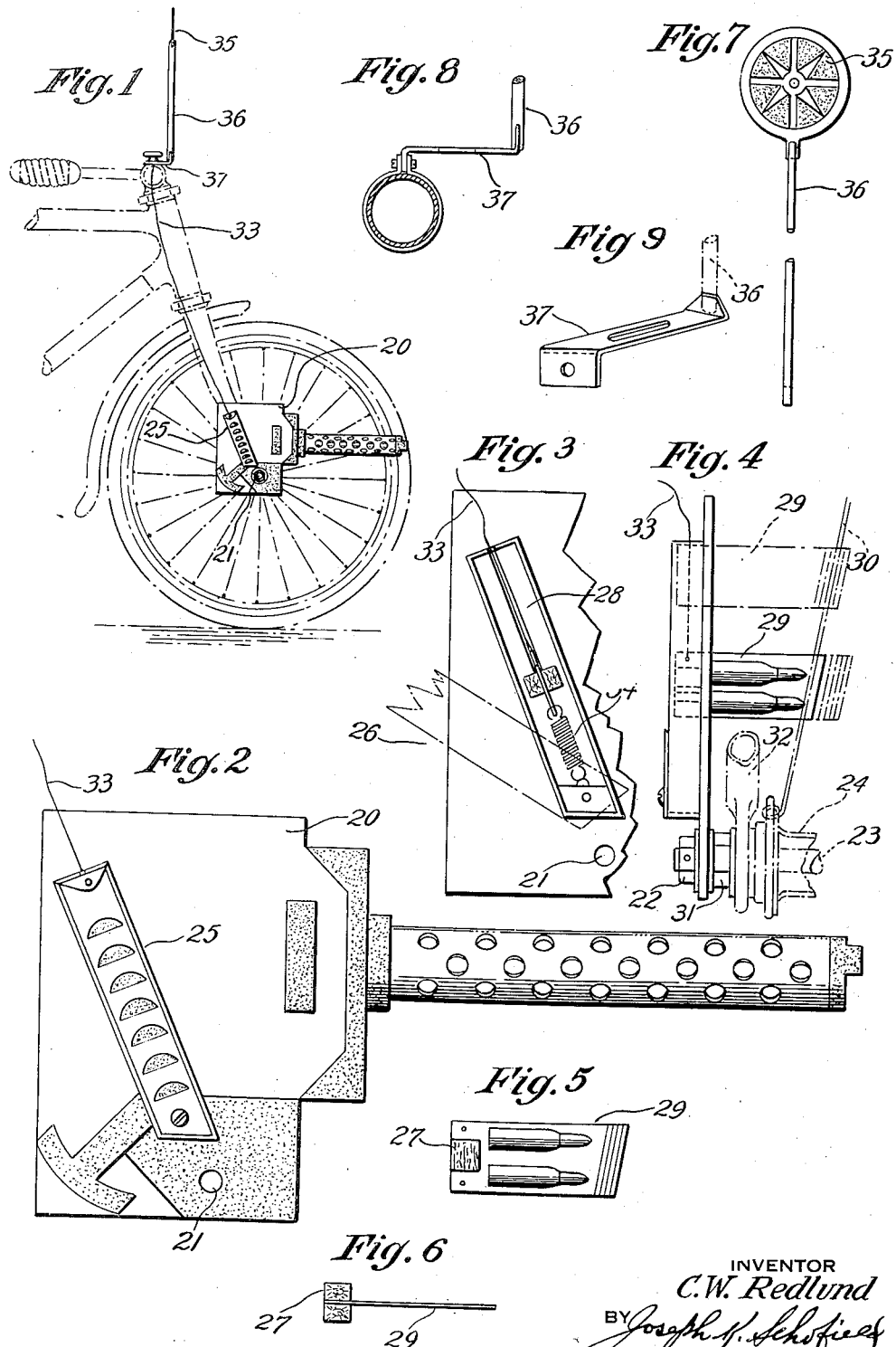
INVENTOR
C. W. Redlund
BY Joseph H. Schofield
ATTORNEY Patented Jan. 16, 1945

2,367,430

UNITED STATES PATENT OFFICE 2,367,430

AMUSEMENT ATTACHMENT FOR BICYCLES

Charles W. Redlund, West Hartford, Conn.

Application August 27, 1942, Serial No. 456,345

4 Claims. (Cl. 46—112)

An object of the present invention is to provide an attachment for bicycles which during operation will simulate sounds such as those of a motor cycle engine, machine gun or the like.

Another object of the invention is to mount a plate-like member adjacent a wheel and mount an extension thereon projecting laterally from the plate-like member so that a portion thereof may contact the spokes of the wheel and be vibrated thereby.

A still further object of the invention is to provide means to render the extension member inoperative by retracting it from engagement with the spokes.

With the above and other objects in view the invention may include the features of construction and operation set forth in the following specification and illustrated in the accompanying drawing.

In the accompanying drawing annexed hereto and forming a part of this specification, I have shown the invention embodied in one form for application to standard bicycles but it will be understood that the invention can be otherwise embodied and that the drawings are not to be construed as defining or limiting the scope of the invention, the claims appended to this specification being relied upon for that purpose.

In the drawing:

Fig. 1 is a side elevation of an illustrative form of the invention shown applied to a bicycle.

Fig. 2 is an enlarged side elevation of the principal members forming the invention.

Fig. 3 is a detail view of an enclosure and vibrating member mounted therein.

Fig. 4 is a front view of the members shown in Fig. 3 as applied to a bicycle.

Figs. 5 and 6 are side and edge views respectively of the flexible member used with the form of invention shown in the drawing.

Fig. 7 is a front view of a sighting device which may be used with the form of invention shown in the drawing, and Figs. 8 and 9 are views of means for holding the sighting device upon the bicycle.

In the above mentioned drawing there has been shown but one embodiment of the invention which is now deemed preferable, but it is to be understood that changes and modifications may be made within the scope of the appended claims without departing from the spirit of the invention.

Briefly, and in its broadest aspect, the invention may include some or all of the following principal parts: First, a plate-like member shaped and preferably ornamented to simulate a motor cycle engine, machine gun or the like; second, a flexible member or pair of flexible members mounted on the plate-like member at one end and extending to a position so that the free ends may engage the spokes of a wheel; third, a receptacle mounted on the plate-like member.

Referring in detail to the form of the invention shown in the drawing there is provided a plate-like member 20 conformed and ornamented to simulate a machine gun. This member by means of a hole 21 may be mounted on the axle of a bicycle and secured in fixed position thereon by means of the nut 22 on the shaft 23 extending through the axle 24 of the wheel.

On the front face of the member 20 is a housing or receptacle 25 secured directly to the plate. This housing may have a hinged cover 26 to enclose a member 27. The member 20 is provided with an elongated slot 28 located centrally of the housing 25 and extending substantially the entire length of the housing. On the member 27 is an extension 29 fastened to the member or members 27 and extending through the slot 28 to engage the spokes 30 of the wheel. To adjust the position of the member 20 so that the end of the projections 29 will contact the spokes 30, one or more suitable washers 31 may be inserted between the frame 32 and the member 20. Also the flexible material of which the projections 29 are preferably made may be cut off along lines as indicated at the end of the projections.

The member 27 forms a head portion to which the projection 29 is attached and substantially fills the transverse dimension of the enclosure 25 and the projection 29 extends through the central slot 28. As a result of this construction contact of the projection 29 with the spokes 30 during rotation of the wheel vibrates the head portion 27 against opposite side walls of the enclosure 25 and thus produces a rattling sound resembling that of a machine gun.

To render the member 27 inoperative to produce a sound, provision is made to move this member to a portion of the enclosure so that the projection 29 cannot contact the spokes 30. For this purpose a cable 33 is attached to the member 27 by means of which the member 27 and its projection 29 may be raised to the upper part of the enclosure 25 against the tension of a spring 34 within the enclosure 25. The spring 34 as seen in Fig. 7 is attached at one end to the member 27 and at its opposite end to the lower end wall of the enclosure 25.

As shown in Fig. 1 an imitative sighting device may be mounted on the frame of the bicycle, this being in the form of a circular member 35 having a central opening mounted on the upper end of a shaft 36. Shaft 36 may be held in position on the frame by means of a connecting piece 37.

I claim:

1. An attachment for bicycles comprising in combination, a plate-like member mounted on a portion thereof adjacent a wheel, an enclosure secured to a face of said member, and a movable member within said enclosure and having an extension extending laterally therefrom, whereby during operation said extension with the movable member in one position within the receptacle will be contacted by the spokes of the wheel and said member within the enclosure vibrated against the side walls thereof.

2. An attachment for bicycles comprising in combination, a plate-like member mounted on a portion thereof adjacent a wheel, an enclosure secured to a face of said member and having parallel side walls throughout its length, and a movable member within said enclosure and having an extension extending laterally therefrom, whereby during operation said extension will be contacted by the spokes of the wheel and said member within the enclosure vibrated against the side walls thereof and manual means extending outside said receptacle to move said member longitudinally within said receptacle.

3. An attachment for bicycles comprising in combination, a plate-like member mounted on a portion thereof adjacent a wheel, an enclosure secured to a face of said member, a movable member having a head housed within said enclosure and having a flexible extension extending laterally therefrom and through said plate-like member, whereby during operation said extension will be contacted by the spokes of the wheel and said head within the enclosure vibrated against the side walls thereof, and means to disengage said extension from engagement with said spokes.

4. An attachment for bicycles comprising in combination, a plate-like member mounted on a portion thereof adjacent a wheel, an enclosure having parallel side walls secured to a face of said member, a member slidable within said enclosure and having an extension extending laterally therefrom and through said plate-like member, whereby during operation said extension will be contacted by the spokes of the wheel and said member within the enclosure vibrated against the side walls thereof, means normally holding said movable member in position for engagement of its extension by the spokes of said wheel and means to move said enclosed member to a position within said enclosure out of engagement with the spokes of the wheel.

CHARLES W. REDLUND.